United States Patent [19]

Jones

[11] 4,060,285

[45] Nov. 29, 1977

[54] BRAKE CONTROL LOGIC CIRCUIT FOR VEHICLE SKID CONTROL BRAKE SYSTEM

[75] Inventor: James J. Jones, Plano, Tex.

[73] Assignee: Texas Instruments Incorporated, Dallas, Tex.

[21] Appl. No.: 712,308

[22] Filed: Aug. 6, 1976

Related U.S. Application Data

[62] Division of Ser. No. 266,798, June 27, 1972, Pat. No. 3,982,793.

[51] Int. Cl.² .............................................. B60T 8/02
[52] U.S. Cl. ..................................... 303/106; 303/20; 361/238
[58] Field of Search .......................... 180/82 R, 105 E; 188/181; 235/150.2, 150.24; 244/111; 303/20, 91, 103, 106; 317/5; 340/53, 62; 361/238

[56] References Cited

U.S. PATENT DOCUMENTS

| | | | |
|---|---|---|---|
| 3,578,819 | 5/1971 | Atkins | 303/20 X |
| 3,610,703 | 10/1971 | Slavin et al. | 303/20 X |
| 3,834,770 | 9/1974 | Fleischer et al. | 303/106 |
| 3,880,474 | 4/1975 | Scharlack | 303/20 X |

*Primary Examiner*—Stephen G. Kunin
*Attorney, Agent, or Firm*—Harold Levine; James T. Comfort; William E. Hiller

[57] ABSTRACT

An improved vehicle skid control braking system is provided of the type that selectively controls the engagement and disengagement of the brake system of the vehicle in accordance with selective braking conditions, such as, vehicle speed, wheel speed, road surface conditions, wheel speed "slip" conditions, etc. The system includes first and second signal generating circuit components for respectively generating vehicle wheel speed and vehicle speed signals; a comparator responsive to the wheel speed and vehicle speed signals for generating a first control signal when the relationship therebetween is at a predetermined condition; a third signal generating circuit component for generating a second and third control signal when the rate of change of the wheel speed reaches a first and second value, respectively; a fourth signal generating circuit component for generating a fourth control signal proportional to the rate of change of the wheel speed signal when the first and second values are reached; and logic circuitry selectively responsive to the first, second, third and fourth control signals for disengaging the vehicle brake system when the predetermined condition and first value are reached and for sequentially engaging and disengaging the vehicle brake system in response to the fourth control signal when the predetermined condition and second value are reached.

7 Claims, 7 Drawing Figures

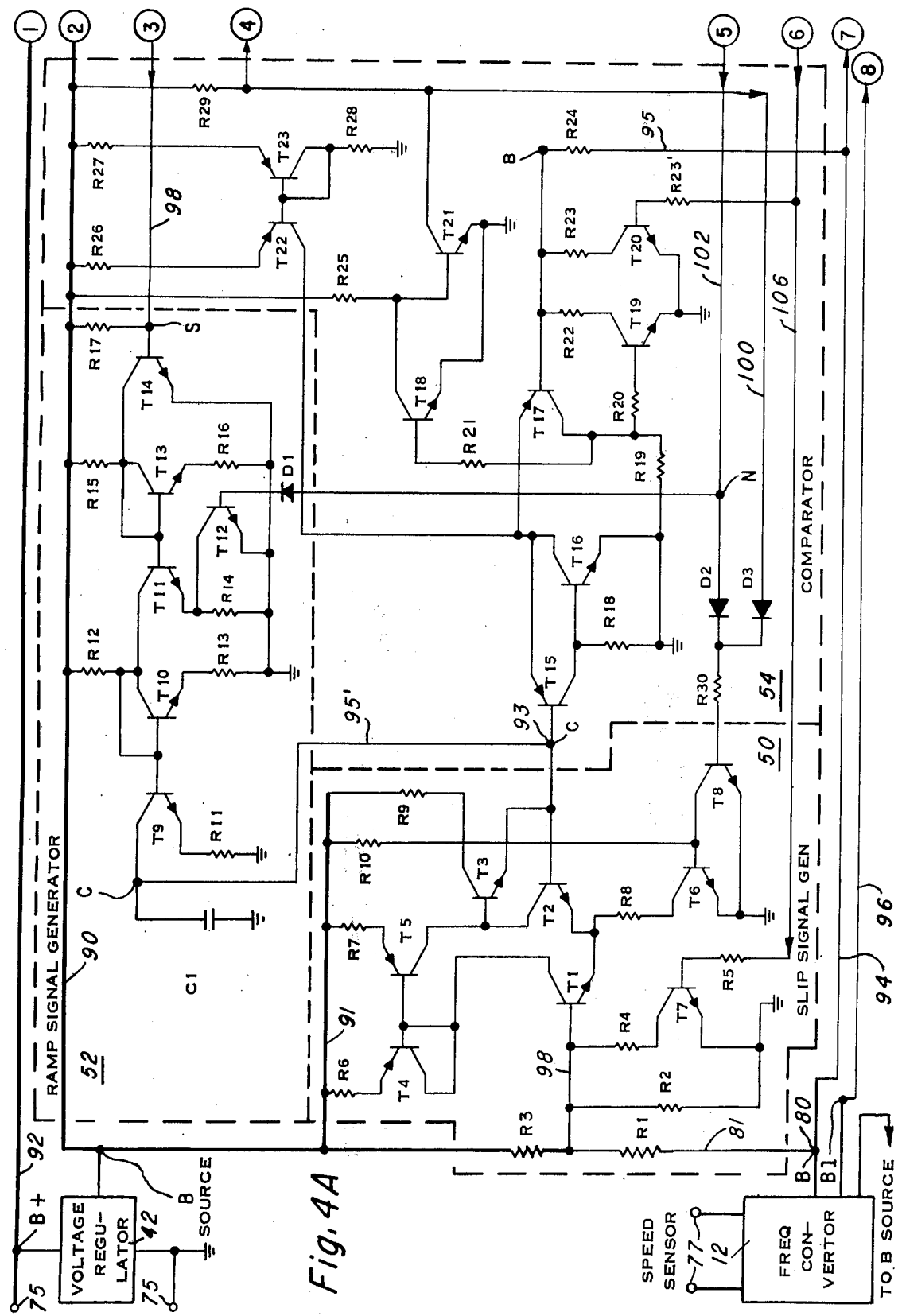

BRAKE CONTROL LOGIC CIRCUIT FOR VEHICLE SKID CONTROL BRAKE SYSTEM

This is a division of application Ser. No. 266,798, filed June 27, 1972, now U.S. Pat. No. 3,982,793 issued Sept. 28, 1976.

BACKGROUND INFORMATION

This invention relates to a vehicle skid control system, and more particularly to a "pumping-type" or "pulse action" vehicle brake control system that advantageously utilizes in combination: (1) Speed Sensor means; (2) Frequency Convertor means; (3) Slip and Ramp Signal Generator and Comparator Circuit means; (4) D.C. Level Detector and Zero Velocity Gate circuit means; (5) Acceleration and Deceleration Differentiator circuit means; (6) Variable Threshold Acceleration and Deceleration Gate Circuit means; (7) Acceleration Programmed Oscillator circuit means; (8) Fixed Threshold Variable Duty Cycle Pulse Generator circuit means; (9) Reset Timer and Gate Circuit means; (10) Brake Control Logic circuit means; and (11) Failsafe Monitoring and Indicating means.

When the operator of a land vehicle desires to stop his vehicle under emergency braking conditions or under adverse road conditions, a realistic probability exists that the land vehicle will undergo an uncontrolled skid, or a controllable skid which prevents the operator from bringing his land vehicle to a safe stop within the distance available. Under these circumstances, one factor that indicates an imminent skid is the relative relationship between vehicle wheel speed and vehicle speed. It has been readily accepted by safety experts and professional land vehicle drivers that vehicle stability can be achieved by automatically "pumping" or "pulsing" of the brakes associated with the wheels of the land vehicle in a pre-programmed manner dynamically related to the rate of acceleration and deceleration of the land vehicle.

In more recent times, several systems have been developed that operate on the principle of selectively inhibiting the normal braking action initiated by the operator of the land vehicle. In one of these systems, wheel speed sensors are utilized to generate A.C. signals that are proportional to vehicle wheel speed. The vehicle wheel speed signals are then processed through a control module which generates a D.C. voltage to energize a solenoid in an actuator that controls the hydraulic braking system to the vehicle wheels. When a skid is imminent, a command signal from the control module causes the actuator solenoid to close a vacuum passage in a diaphragm chamber. By action of the diaphragm and the normal hydraulic pressure from the master cylinder of the land vehicle braking system as developed by the operator thereof, the hydraulic pressure to the vehicle wheels is released, thereby inhibiting the vehicle wheel braking action. When the vehicle wheels spin up to the vehicle speed or to a selective lower speed, the control module produces a signal to deenergize the actuator solenoid. This in turn restores line pressure in the vehicle braking system and reapplies the vehicle brakes. In effect, what is achieved by this system is that the vehicle brakes are "pumped" or "pulsed" in a manner often recommended for controlled braking under adverse driving conditions.

The control module of the aforementioned system includes a frequency convertor for each wheel speed sensor for converting a frequency varying signal into a varying direct current signal proportional thereto. A summation of the outputs from each of the frequency convertors produces a composite of the vehicle wheel speed signals. Respective deceleration and acceleration rate detectors respond to the output of the summing amplifier for producing outputs proportional to the rate of deceleration and acceleration respectively of the wheels of the land vehicle. A signal proportional to the output of the summing amplifier is transferred to a vehicle velocity ramp generator and one input of an automatically adjustable switching circuit. The vehicle velocity ramp generator produces a step function ramp signal having an overall slope related to the actual speed of the land vehicle when braking to a stop. The automatically adjustable switching circuit also receives an input from the vehicle velocity ramp generator and an input from a retarding force detector, and produces an output whenever the summation of the wheel speed signal, the velocity ramp signal, and the retarding force signal reaches a first threshold condition. The retarding force detector produces an output signal which relates to the braking factors including tire condition, brake condition, and the condition of the road surface. To generate a control signal to the actuator solenoid, the output of the deceleration rate detector, the acceleration rate detector, and the automatically adjustable switching circuit must have a certain designated relationship. These three signals are the inputs to the brake controller as the last component in the control module.

A more detailed description of the features briefly stated above with regard to a prior known vehicle skid control system is set forth in a copending patent application, Ser. No. 25,131, filed Apr. 2, 1970, for "VEHICLE SKID CONTROL SYSTEM", which is assigned to the assignee of this Application.

Another known and similar system that operates on the principle of inhibiting the normal braking action initiated by the operator of the land vehicle is set forth in U.S. Pat. No. 3,578,819, issued May 18, 1971, for "SKID CONTROL SYSTEM", in the name of Thomas M. Atkins.

OBJECTIVES OF THE INVENTION

An object of the present invention is to provide an improved vehicle skid control module for processing wheel speed signals in a vehicle skid control braking system.

Another object of this invention is to provide a vehicle skid control module for producing a "pumping" or "pulsing" type breaking action in a skid control vehicle braking system.

Another object of this invention is to provide a vehicle skid control module for generating brake inhibit signals in a vehicle skid control braking system.

Another object of this invention is to provide an improved vehicle skid control module for generating brake control signals for controlling the brake system thereof in a vehicle skid control braking system.

Another object of this invention is to provide a vehicle brake control system which selectively controls the engagement and disengagement of the brake system of the vehicle in accordance with selected braking conditions.

Another object of this invention is to provide an improved vehicle skid control module for processing vehicle and vehicle wheel speed signals in a vehicle skid control braking system that advantageously utilizes a frequency to voltage convertor, a slip and ramp signal generator, a rate differentiator and variable threshold circuit, and a frequency control one shot circuit.

Another object of this invention is to provide a vehicle brake control system which advantageously includes a novel Frequency Convertor; novel Variable Threshold Acceleration and Deceleration Gate Circuits; a novel Acceleration Programeed Oscillator and Fixed Threshold-Variable Duty Cycle Pulse Generator; novel Acceleration and Deceleration Differentiators; a novel D.C. Level Detector and Zero Velocity Gate; a novel Brake Control Logic Circuit; a novel Slip and Ramp Signal Generator and Comparator; a novel Failsafe Monitor and Indicator; and a novel Reset Timer and Gate.

BRIEF DESCRIPTION OF THE DRAWINGS

FIGS. 4A – D represent a four sheet schematic of a solid state vehicle skid control module for producing "pumping" or "pulsing" action in a vehicle skid control braking system, such sheets being connected by the numbered connecting lines along either or both of the right and left sides of each drawing as the case may be.

BRIEF DESCRIPTION OF THE INVENTION

Figure 3:
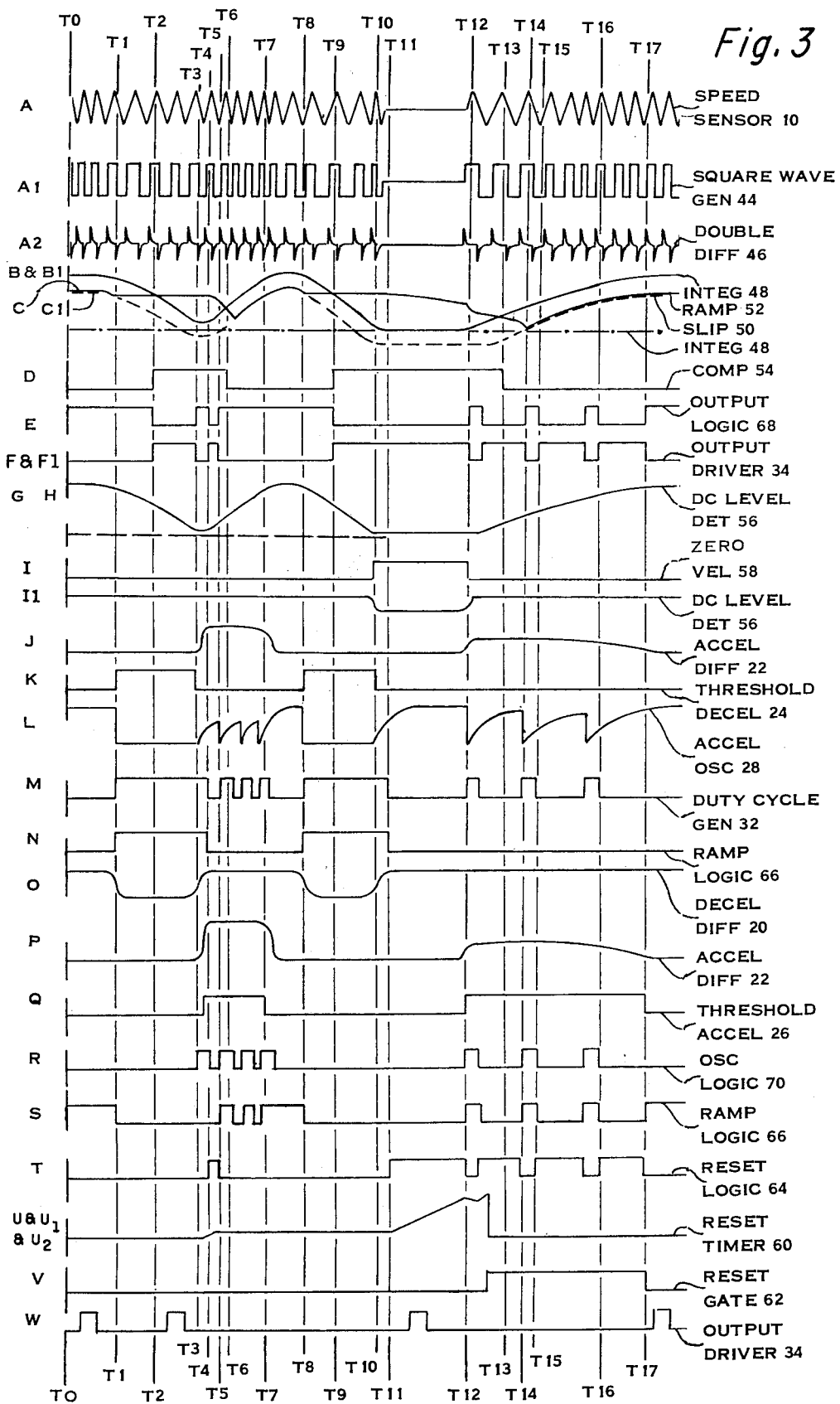
FIG. 3 graphically represents exemplary waveforms that are generated by various components in the block diagrams of FIGS. 1 and 2.
Figure 4B:
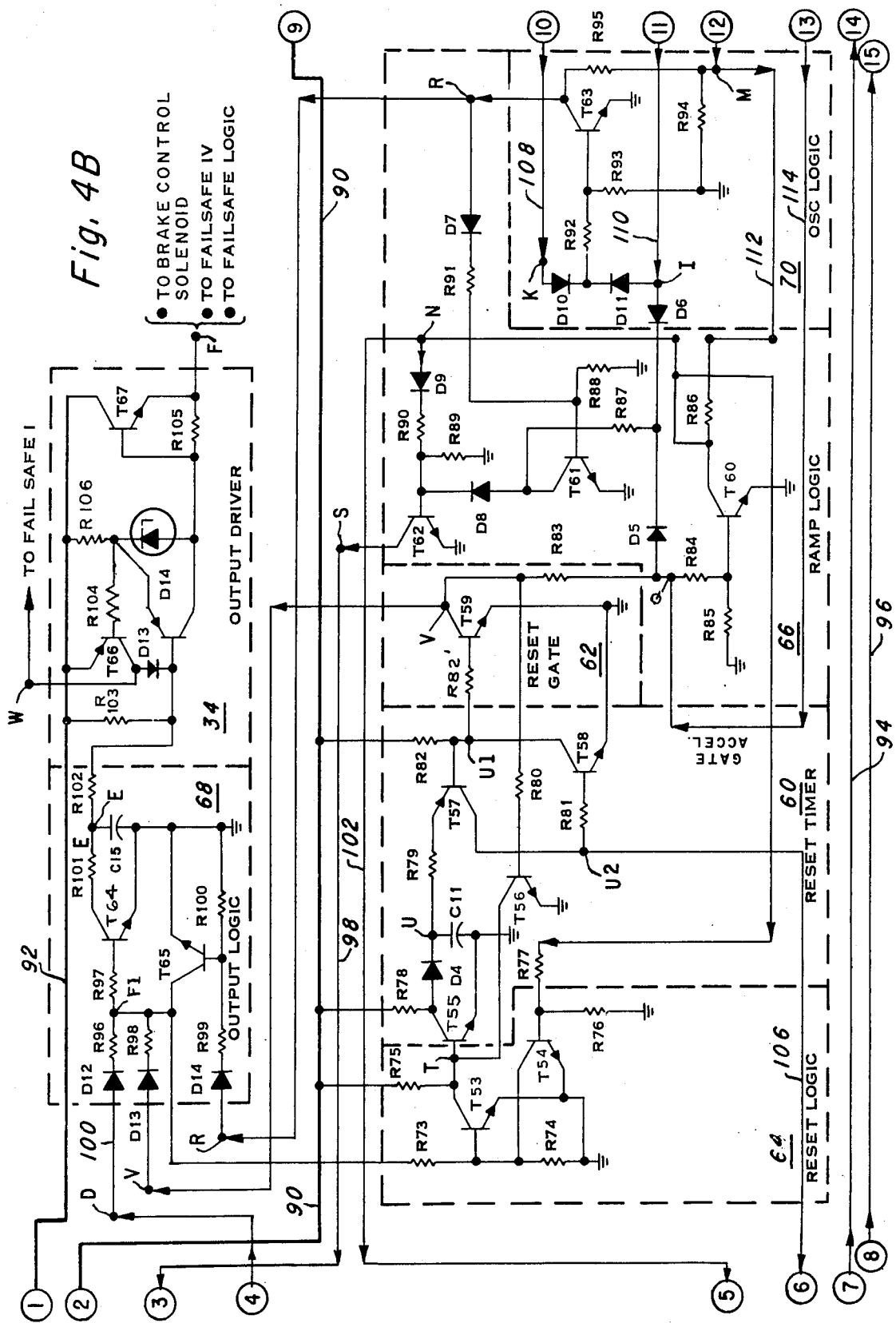
Figure 4C:
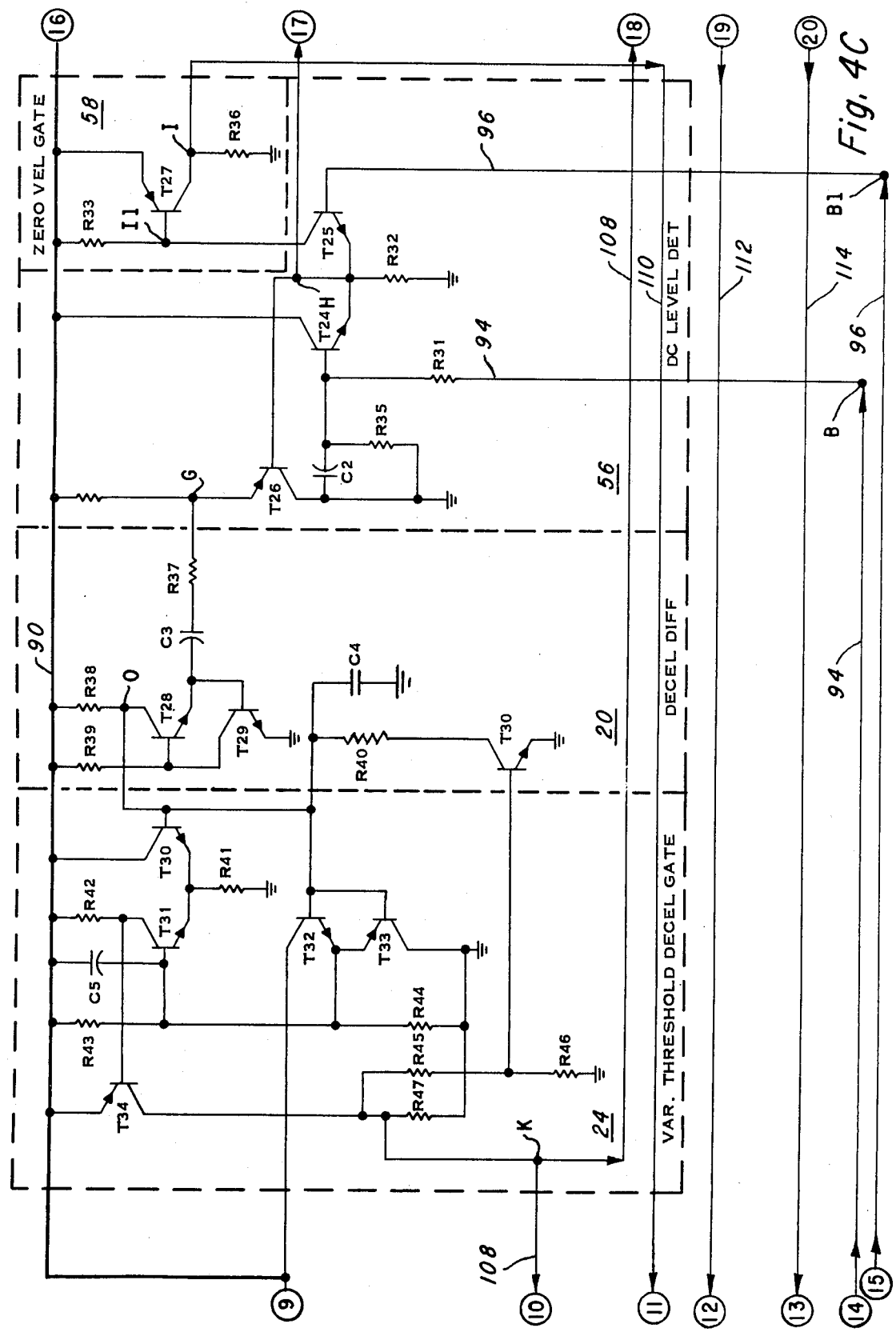
Figure 4D:
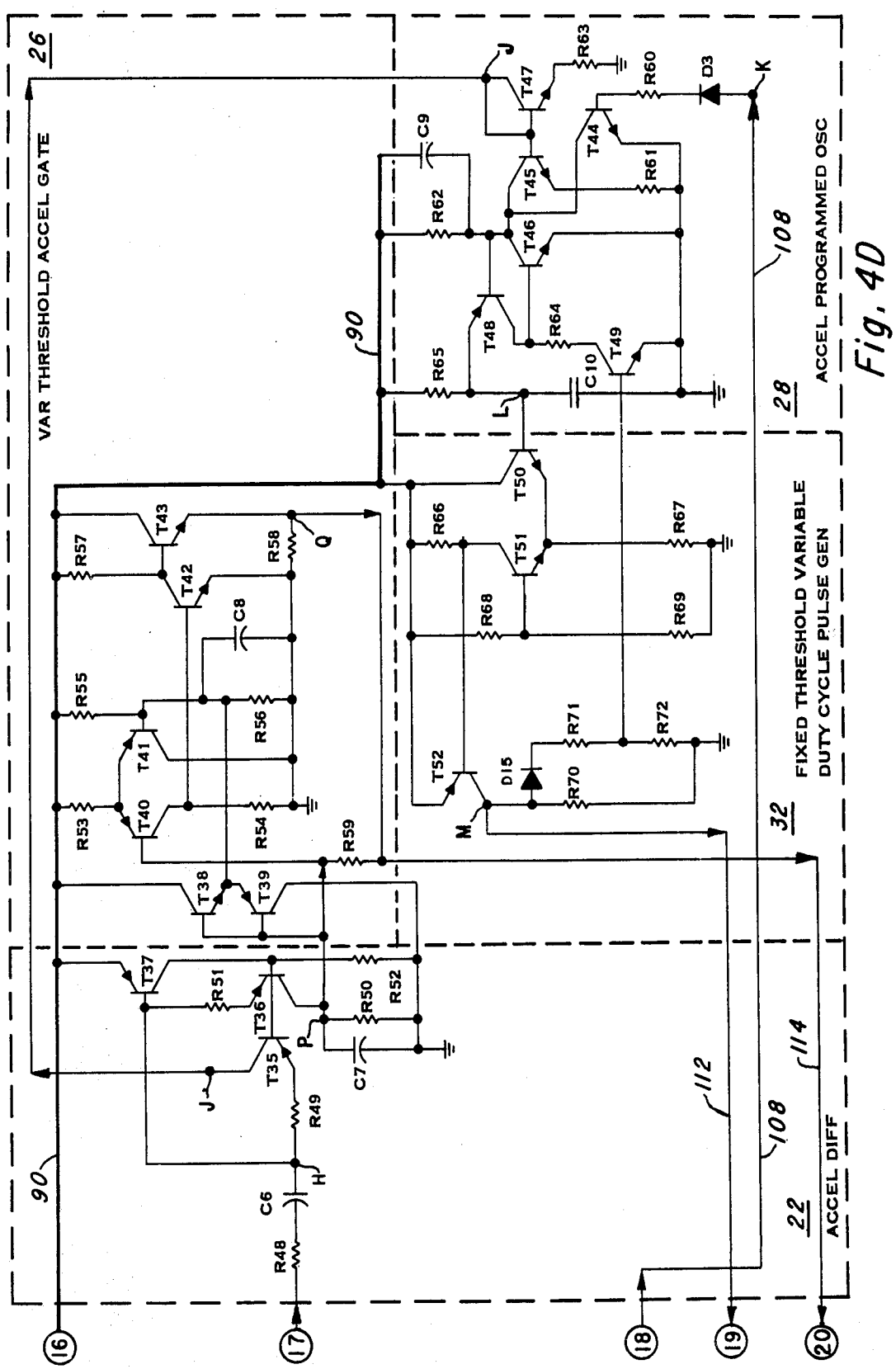

In accordance with one embodiment of the present invention, a wheel sensor, which may be coupled to the wheels or to the drive shaft of the land vehicle, generates AC signals having a frequency varying in accordance with vehicle wheel speed (waveform A of FIG. 3). These frequency varying signals A are coupled to a Frequency Convertor that produces a DC output signal having a voltage magnitude that varies proportionally with the frequency of the AC signals generated by the speed sensor (waveform B of FIG. 3). The varying DC wheel speed signals B generated by the frequency convertor are coupled to a Slip and Ramp Signal Generator and Comparator and to a DC Level Detector and Zero Velocity Gate Circuit.

The Slip and Ramp Signal Generator and Comparator performs three basic functions: First, it modifies or offsets the varying DC wheel speed signals B coupled thereto by a predetermined percentage or value, which is referred to as the "slip" signal (waveform $C_1$ of FIG. 3); second, under the control of the slip signal $C_1$, it generates a ramp signal (waveform C of FIG. 3) having a programmable constant current rate of discharge; and third, it compares the ramp signal C and the varying DC signal B, and when vehicle wheel speed drops below the related vehicle speed represented by the ramp signal, it generates a "slip" gate signal (waveform D of FIG. 3). The slip gate signal D is then coupled to one of the inputs of a Brake Control Logic circuit.

The DC Level Detector and Zero Velocity Gate circuit performs three basic functions. First, it generates two DC level signals (waveform G and H of FIG. 3) when the frequency of the AC signal A is zero or below a preset value with respect to vehicle wheel speed; second, it generates a zero velocity gate signal (waveform I of FIG. 3) when the varying DC signal B reaches a selected DC Level; and third, it prevents any ripple characteristics of the varying DC signal B coupled thereto, which frequently occur when the land vehicle is operated at low speeds, from being coupled into a Deceleration Differentiator circuit and to an Acceleration Differentiator circuit. The two DC level signals are coupled respectively to the Deceleration and Acceleration Differentiator circuits, while the zero velocity gate signal I is coupled to the Brake Control Logic circuit.

The Deceleration Differentiator circuit differentiates the DC level signal G coupled thereto, and couples a deceleration differentiator signal (waveform D of FIG. 3) to a Variable Threshold Deceleration Gate circuit, which in turn generates a deceleration gate signal (waveform K of FIG. 3) when the rate of deceleration of the vehicle wheels exceeds a preset value.

The Variable Threshold Deceleration Gate circuit has a variable threshold feature which produces an output gate signal having a "turn on " threshold at a different level than its "turn off" threshold. That is to say, the Variable Threshold Deceleration Gate circuit "turns on" at a lower threshold than it "turns off" so as to provide a desirable fast "turn off" relative to the rate of deceleration of the vehicle wheels. The Variable Threshold Deceleration Gate circuit output gate signal is then coupled to the Brake Control Logic circuit.

The Acceleration Differentiator circuit is similar to the Deceleration Differentiator circuit but for the fact that it operates in response to the rate of acceleration of the vehicle wheels. This circuit differentiates the DC Level signal H coupled thereto and couples a first acceleration differentiator signal (waveform J of FIG. 3) to an Acceleration Programmed Oscillator circuit, and couples a second acceleration differentiator signal (waveform P of FIG. 3) to a variable Threshold Acceleration Gate circuit.

The Variable Threshold Acceleration Gate circuit is also similar to the Variable Threshold Deceleration Gate circuit but for the fact that it is responsive to the rate of acceleration of the vehicle wheels. This circuit also has a variable threshold feature wherein the "turn on" threshold of the circuit is at a lower value than the "turn off" threshold of the circuit. The acceleration gate signal (waveform Q of FIG. 3) is coupled to the Brake Control Logic circuit and to a Reset Timer and Gate circuit.

The Acceleration Programmed Oscillator circuit in response to the acceleration differentiator signal J produces an acceleration oscillator signal (waveform L of FIG. 3) that has a frequency proportional to the rate of acceleration of the vehicle wheels. This acceleration oscillator signal L is then coupled to a Fixed Threshold Variable Duty Cycle Pulse Generator.

The Fixed Threshold Variable Duty Cycle Pulse Generator can be programmed from zero percent to 100 percent duty cycle with respect to the output signal. This circuit produces a duty cycle gate signal (waveform M of FIG. 3) and couples this duty cycle gate signal M to the Brake Control Logic Circuit.

The Reset Timer and Gate circuit receives input signals from both the Brake Control Logic circuit (waveform T of FIG. 3) and from the Variable Threshold Acceleration Gate circuit (waveform Q of FIG. 3) and commences a reset timing cycle at the end of the reset time period which develops a reset gate signal (waveform V of FIG. 3) for selectively coupling the acceleration gate signal Q to the Brake Control Logic circuit.

Fundamentally, the Slip and Ramp Signal Generator and Comparator develops a "slip" signal D, which is a "turn on " gate signal for controlling the brake system of the land vehicle in dynamic proportion to the conditions developed by the Zero Velocity Gate circuit, and the Variable Threshold Acceleration and Deceleration Gate circuits. On the other hand, the brake system of the land vehicle is also controlled by the Reset Gate circuit. Thus, the brake system of the land vehicle is controlled, i.e., "turned on" or "turned off", dependent relative upon wheel speed acceleration rates and wheel velocity levels.

The Brake Control Logic circuit in response to the presence of the several input gate signals applied thereto (i.e., slip gate D, zero velocity gate I, decel gate K, duty cycle gate M, accel gate Q and reset gate V) develops output signals (waveform E, N, S and T of FIG. 3) which are respectively applied to the Output Driver circuit, to "turn on" or "turn off" the brake system of the land vehicle; to the Slip and Ramp Signal Generator, to set the slip and ramp signal generator and comparator and produce the slip gate signal D; and to the Reset Timer and Gate circuit; to reset the skid control module for the succeeding cycle of operation.

The variable AC output signal A generated by the Speed Sensor is also coupled to a Failsafe Monitoring circuit wherein various module, vehicle and vehicle braking conditions are monitored for the purpose of either developing a visual or audible malfunction indication or for blowing a fuse or actuating a circuit breaker as a result of module malfunction, or both. The visual or audible indication feature is for alerting the operator of the land vehicle that a module malfunction exists, while the fusing or circuit braking feature is to remove power from the module and prevent damage thereto. The Failsafe Monitoring circuit may observe many selected characteristics both internal or external to the module. For example, it may detect overcurrent conditions (Failsafe I) of the module and provide a visual or audible indication for the operator and also remove power from the module because this condition means that the land vehicle braking system is malfunctioning in a manner that can damage the module. The Failsafe Monitoring circuit may also generate a visual or audible indication when power to the module is "cut-off" (Failsafe II) but will not fuse or circuit break since this condition cannot damage the module. The Failsafe Monitoring circuit may also generate a visual or audible indication but not remove power from the module when the Speed Sensor line is open (Failsafe III) because this condition merely indicates that the skid control module is malfunctioning in a manner that will not damage the module. A visual or audible indication may be generated by the Failsafe Monitoring circuit when the brake system solenoid is "open" (Failsafe IV) but not fuse or break power since this condition will not damage the module.

Also, the Failsafe Monitoring circuit may generate visual and audible indications for the operator and remove power from the module when it senses a shorted output condition so as to protect the module from "burning out". Monitoring the vehicles braking light switch determines false cycling conditions, when for example the operator is not applying the vehicle braking system. False cycling signals may be accumulated over a given finite period of time whereupon both an operator indication and power removing may occur to both indicate a module malfunction and protect the module from further damage. Other failsafe monitoring conditions can be incorporated into the module of this invention without departing from spirit of this invention.

A more complete understanding of the invention and its advantages will be apparent from the specification and claims and from the accompanying drawings illustrative of the invention.

Detailed descriptions of preferred embodiments of this invention follows with reference being made to the drawings wherein like parts and elements have been given like reference numerals for clarity and understanding of the novel, useful and unobvious features of this invention.

DETAILED DESCRIPTION — FIG. 1

Figure 1:
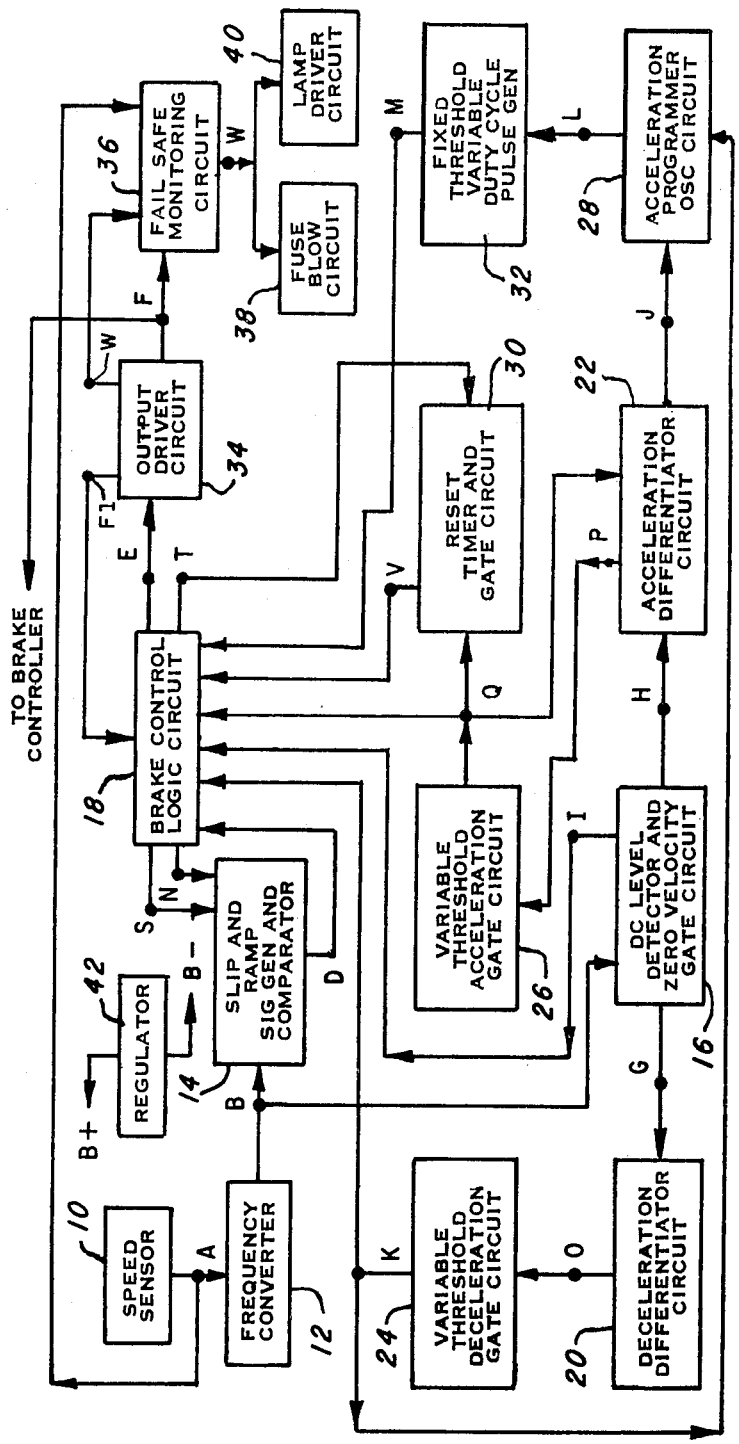
FIG. 1 is a block diagram of one embodiment of an improved vehicle skid control module for a vehicle skid control braking system.

Referring to the drawings, in FIG. 1 there is illustrated in block diagram format the components of one embodiment of a control module in a vehicle skid control braking system including a Speed Sensor 10 and a Frequency Convertor 12. The Speed Sensor 10 is coupled to either the wheels or to the drive shaft of a land vehicle, e.g., electromagnetically, optically or mechanically, and generates a varying AC signal (waveform A of FIG. 3) which has frequency variations proportional to wheel speed. That is to say, the faster the wheel speed, the higher the frequency of the signal A connected to the Frequency Convertor 12. The variable AC signals A generated by the Speed Sensor 10 are coupled to the Frequency Convertor 12 wherein they are converted to a varying dc signal (waveform B of FIG. 3) having a dc magnitude proportional to vehicle wheel speed. The varying dc signal B generated by the Frequency Convertor 12 is coupled to both the Slip and Ramp signal Generator and Comparator 14 and the DC Level Detector and Zero Velocity Gate circuit 16.

The Slip and Ramp Signal Generator and Comparator 14 modifies or offsets the varying dc signal B a preselected value and produces a "slip" signal (waveform $C_1$ of FIG. 3), and then under the control of the slip signal $C_1$, it develops a ramp signal (waveform C of FIG. 3) having a dynamically programmable constant current rate of discharge. The ramp signal C is then compared with the varying dc signal B, and when the wheel speed of the land vehicle drops below the related vehicles speed represented by the ramp signal C, a "slip" gate signal (waveform D of FIG. 3) is generated. The slip gate signal D is then coupled to one of the inputs of the Brake Control Logic circuit 18.

The DC level Detector and Zero Velocity Gate circuit 16, in response to the variable dc signal B generated by the Frequency Convertor 12, generates two output signals (waveform G and H of FIG. 3), each signal being clamped at a selected dc level of the input signal applied thereto, with such signals being respectively coupled to the Deceleration Differentiator circuit 20 and the Acceleration Differentiator circuit 22. Basically, the reason for detecting the preselected dc levels of the input signal B and developing output signals G & H, is to prevent any ripple characteristics of the signal applied thereto, which frequently occurs when the land vehicle is operated at low speeds, from being coupled into the Deceleration and Acceleration Differentiator circuits 20, 22. The DC Level Detector and Zero Velocity Gate circuit 16 develops a zero velocity gate signal (waveform I of FIG. 3) and couples this signal I to one input of the Brake Control Logic circuit 18.

The Deceleration Differentiator 20 differentiates the variable dc signal G applied thereto and generates a pulse output signal (waveform O of FIG. 3) which signal O is coupled to the Variable Threshold Deceleration Gate circuit 24; while the Acceleration Differentiator 22 differentiates the variable dc signal H applied thereto and generates a pulse output signal (waveform P of FIG. 3) which signal P is coupled to the Variable Threshold Acceleration Gate circuit 26.

The Variable Threshold Deceleration Gate circuit 24 has a variable threshold feature which produces an output gate signal (waveform K of FIG. 3) having a "turn on" threshold at a different level then its "turn off" threshold. That is to say, the Variable Threshold Deceleration Gate circuit 24 "turns on" at a lower threshold than it "turns off" so as to provide a desirable fast "turn off" of the vehicle braking application relative to the rate of deceleration of the wheels of the land vehicle. The pulse output signal K developed by the Variable Threshold Deceleration Gate circuit 24 is present when the deceleration rate of change of the vehicle wheels exceeds a preset value and is coupled to one of the inputs of the Brake Control Logic circuit 18 and to the Acceleration Programmed Oscillator circuit 28.

The Variable Threshold Acceleration Gate circuit 26 is similar to the Variable Threshold Deceleration Gate circuit 24 but for the fact that it is responsive to the pulse output signal P developed by the Acceleration Differentiator 22, and generates a pulse output signal (waveform Q of FIG. 3) indicative of rate of acceleration of the vehicle wheel speed of a preselected value. The circuit also has a variable threshold feature in which the "turn on" of the circuit is at a lower threshold than the "turn off" feature of the circuit. The pulse output signal Q of the Variable Threshold Acceleration Gate circuit 26 is coupled to one of the inputs of the Brake Control Logic 18, the Acceleration Differentiator circuit 22 and the Reset Timer and Gate circuit 28.

The Acceleration Programmed Oscillator circuit 28 receives an analog signal (waveform J of FIG. 3) from the Acceleration Differentiator 22 which programs the oscillator so as to produce a sawtooth pulse output signal (waveform L of FIG. 3) that has a frequency proportional to the rate of acceleration of the vehicle wheels. This output sawtooth signal L is coupled to a Fixed Threshold Variable Duty Cycle Pulse Generator 32.

The Fixed Threshold Variable Duty Cycle Pulse Generator 32 is programmable from zero percent to 100 percent duty cycle with respect to the output signal developed thereby (waveform M of FIG. 3). The output signal M of the Fixed Threshold Variable Duty Cycle Pulse Generator 32 is coupled to one of the inputs of the Brake Control Logic circuit 18.

The Reset Timer and Gate circuit 30 is reset by one of the outputs of the brake control logic circuit 18 (waveform T of FIG. 3) and commences a reset timing cycle at the end of the reset time period which develops a reset gate signal (waveform V of FIG. 3) for controlling the application of the output pulse signal Q generated by the Variable Threshold Acceleration Gate circuit 26 (waveform Q of FIG. 3) and selectively couples this output pulse signal Q to one of the inputs of the Brake Control Logic circuit 18.

In addition to the pulse output signal T, the Brake Control Logic circuit 18 also develops an output pulse (waveform E of FIG. 3) and couples the pulse signal E to the Output Driver circuit 34, which in turn develops output pulse signals (waveform F, F1 and W of FIG. 3). The output pulse signal F is coupled to the Brake Controller (not shown) of the land vehicle braking system and to the Failsafe Monitoring circuit 36. The output pulse signal W is coupled to the Failsafe Monitoring circuit 36. The output pulse signal F1 applied to the Brake Control Logic circuit 18 sets the logic circuit in condition for a subsequent brake control cycle of operation.

The Failsafe Monitoring circuit 36 also receives the variable AC signal A from the Speed Sensor 10, and along with the output pulse signals F and W, monitors module system operation and develops signals which either drive an indicator, such as a lamp or buzzer, or disconnect power to the module, i.e., blow a fuse or open a circuit breaker, or both, for visual or audible indication of module or braking system malfunction, or for disconnecting power from the module to prevent further damage, or both. The Failsafe Monitoring circuit 36 respectively couples control signals to the Fuse Blow circuit 38 and/or the Lamp Driver circuit 40.

DETAILED DESCRIPTION — FIG. 2

Figure 2:
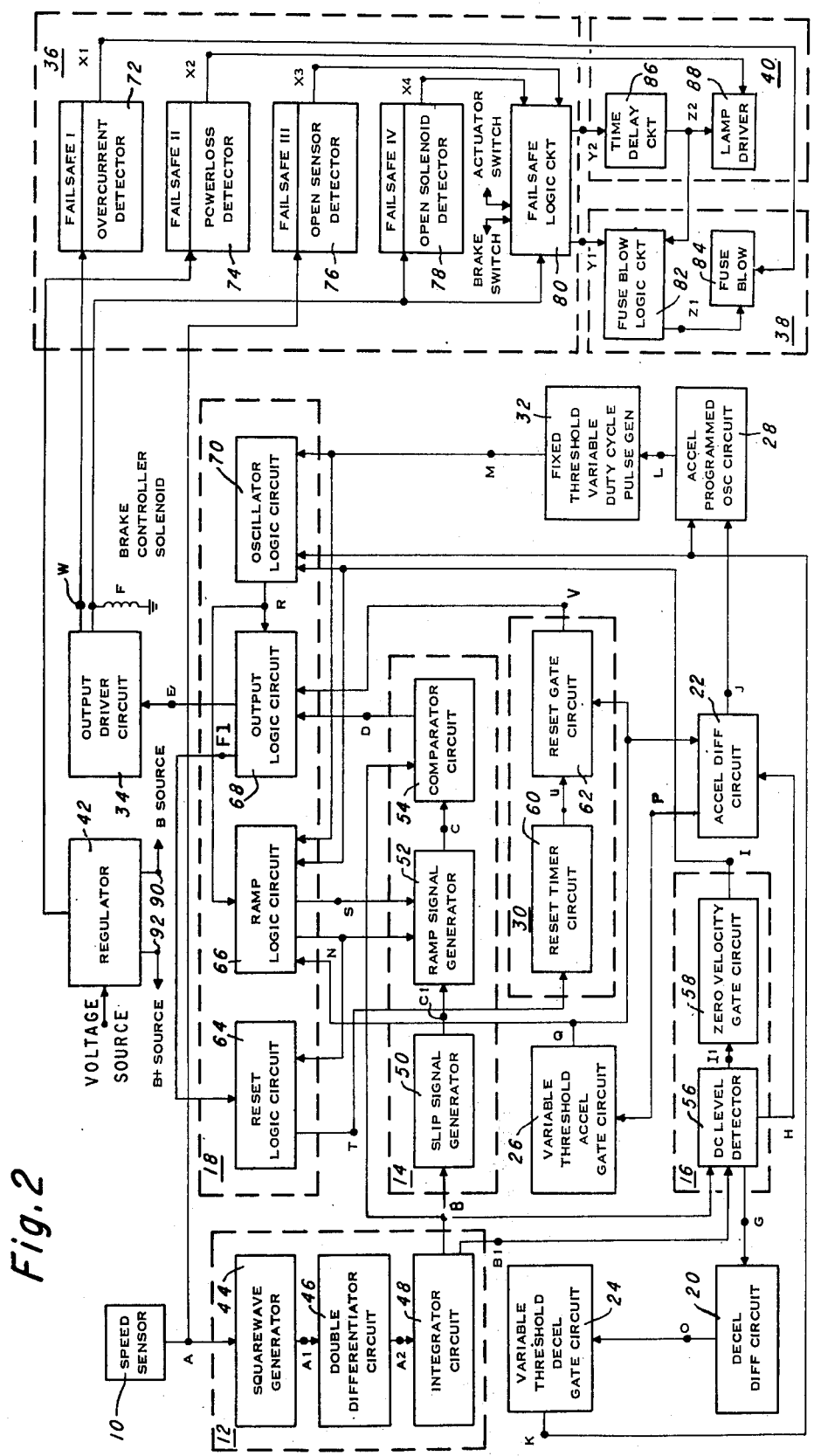
FIG. 2 is a block diagram of another embodiment of an improved vehicle skid control module for a vehicle skid control braking system.

Referring now to FIG. 2, there is illustrated in block diagram format the components of another embodiment of a control module for a vehicle braking system which is similar in many respects, particularly from a functional and operational viewpoint, to the block diagram above described with regard to FIG. 1. The fundamental differences between the FIG. 2 circuit and the above described FIG. 1 circuit are shown within the areas circumscribed by dashed lines, which are the Frequency Convertor 12, the Slip and Ramp Signal Generator and Comparator 14, The DC Level Detector and Zero Velocity Gate circuit 16, the Brake Control Logic circuit 18, the Reset Timer and Gate circuit 30, the Failsafe Monitoring circuit 36, the Fuse Blow circuit 38, and the Lamp Driver circuit 40. The Speed Sensor 10, Deceleration and Acceleration Differentiator circuits 20 and 22, the Variable Threshold Deceleration and Acceleration Gate circuits 24 and 26, Output Driver circuit 34 and the Regular 42, operate functionally in the manner above set forth with particularity in the detailed description of the FIG. 1 embodiment of this invention.

The Frequency Convertor 12 includes a Square Wave Generator 44, a Double Differentiator circuit 46 and an integrator circuit 48. The Square Wave generator 44 responds to the variable AC signal A generated by the Speed Sensor 10, clips and inverts the varying AC signal A, and generates the square wave signal A1. The square wave signal A1 is coupled to the Double Differentiator circuit 46, wherein the square wave signals A1 are differentiated to produce the "double-diff" signal A2, which is proportional to the vehicle wheel speed. The Integrator circuit 48 receives the "double-diff" signal A2 and integrates such signal to produce the varying DC signals B and B1, which have magnitudes related to the vehicle wheel speed. The speed dependent varying DC signals B and B1 generated by the Integrator circuit 48 are respectively coupled to the Slip and Ramp Signal Generator and Comparator 14 and the DC Level Detector and Zero Velocity gate circuit 16.

The slip and Ramp Signal Generator and Comparator 14 includes a Slip Signal Generator 50, a Ramp Signal Generator 52, and a Comparator circuit 54. In response to the speed dependent varying DC signal B, the Slip Signal Generator 50 modifies or offsets the varying DC signal B a preselected value and produces a "slip" signal C1. The slip signal C1 is coupled to the Ramp Signal Generator 52 wherein the ramp signal C is produced having a dynamically programmable constant current rate of discharge. Both the ramp signal C and the varying DC signal B are coupled to the Comparator circuit 54 wherein these two signals are compared and when the wheel speed of the land vehicle drops below the related vehicle speed represented by the ramp signal C, the "slip" gate signal D is generated. The "slip" gate signal D is coupled to one of the inputs of the Brake Control Logic circuit 18.

The DC Level Detector and Zero Velocity Gate circuit 16 includes a DC Level Detector 56 and a Zero Velocity Gate circuit 58. In response to the speed dependent varying DC signals B and B1, the DC Level Detector 56 generates two varying DC signals G and H, each signal being developed at a selected DC level of the input signals applied thereto and being respectively coupled to the Deceleration Differentiator circuit 20 and Acceleration Differentiator circuit 22. The DC Level Detector 56 fundamentally prevents any ripple characteristics of the varying DC signals B and B1 from being respectively coupled to the Deceleration and Acceleration Differentiator circuits 20, 22. In addition to the varying DC signal G and H, the DC Level Detector 56 also generates a DC level signal II and couples this latter signal to the Zero Velocity Gate circuit 58, which in turn develops a zero velocity gate signal I. The zero velocity gate signal I is coupled to one of the inputs of the Brake Control Logic circuit 18.

The Brake Control Logic circuit 18 includes a Reset Logic circuit 64, a Ramp Logic circuit 66, and Output logic circuit 68, and an Oscillator logic circuit 70. The input signals to the Brake Control Logic circuit 18 are the slip gate signal D, the zero velocity gate signal I, the decel gate signal K, the duty cycle gate signal M, the accel gate signal Q, the reset gate signal V, and the output gate signal F1, while the output signals from the Brake Control Logic circuit 18 are the output logic signal E, the ramp logic signal N, the ramp logic signal S, and the reset logic signal T.

The Oscillator Logic circuit 70 of the Brake Control Logic circuit 18, in response to the zero velocity gate signal I, the decel gate signal K, and the duty cycle gate signal M, respectively generated by the Zero Velocity Gate circuit 58, the Variable Threshold Decel Gate circuit 24, and the Fixed Threshold Variable Duty Cycle Pulse Generator 32, developes the oscillator logic signal R, which is coupled to both the Ramp Logic circuit 66 and the Output Logic circuit 68.

In addition to the oscillator logic signal R, the Ramp Logic circuit 66 is further controlled by the zero velocity gate signal I, the duty cycle gate signal M, and the accel gate signal Q, and in response thereto the Ramp Logic circuit 66 developes the ramp logic signal N and the ramp logic signal S, which are each coupled to the Ramp Signal Generator 52 to set the ramp signal generator 52. The ramp logic signal N is also coupled to the Reset Logic circuit 64.

The Reset Logic circuit 64 receives both the ramp logic signal N and the output driver signal F1 to produce the reset logic signal T, which is coupled to the Reset Timer and Gate circuit 30.

The Reset Timer and Gate circuit 30 includes a Reset Timer circuit 60 and a Reset Gate circuit 62. The reset logic signal T is coupled to the Reset Timer circuit 60 which, in response thereto, commences a reset timing cycle at the end of which a reset timing signal U is produced and coupled to the Reset Gate circuit 62. The Reset Gate circuit 62 also receives the threshold accel signal Q and in response to both the reset timer signal U and the threshold accel signal Q, produces the reset gate signal V, which is coupled to the Output Logic circuit 68.

The Output Logic circuit 68, in response to the slip gate signal D, oscillator logic signal R and reset gate signal V produces the output logic signal E which in turn is coupled to the Output Driver circuit 34 for developing the two module output signals F and W.

As aforestated with regard to the FIG. 1 embodiment of this invention, the Output Driver circuit 34 produces both output signal F and F1, and the output signal W. Output signals F and W are coupled to the Failsafe Monitoring circuit 36 The output signal F1 that is applied to the Reset Logic circuit 64 sets the Reset Logic circuit 64 into condition for a subsequent brake control cycle of operation.

The Failsafe Monitoring circuit 36 includes the Failsafe I overcurrent detector 72, the Failsafe II power loss detector 74, the Failsafe III open sensor detector 76, the Failsafe IV open solenoid detector 78 and the Failsafe Logic circuit 80. As mentioned above, the Failsafe Monitoring circuit 36 monitors module system operation and develops signals which either drive an indicator, such as a lamp or buzzer, or disconnect power to the module, i.e., by blowing a fuse or opening a circuit breaker or both, for either visual or audible indication of module or braking system malfunction, or for disconnecting power from the module to prevent further damage, or both.

Failsafe I is an overcurrent detector which receives the output signal W and monitors such signal to determine module overcurrent conditions. In the event the output signal W indicates an overcurrent condition of the module, Failsafe I develops the failsafe pulse monitor signal X1, which is coupled to the Fuse Blow circuit 84.

Failsafe II is a power loss detector which monitors the regulator 42 to determine whether or not power is coupled to the module. In the event of power failure to the module, Failsafe II detects this condition and developes a Failsafe monitor pulse signal X2 which is coupled to the Lamp Driver circuit 88.

Failsafe III is an open sensor detector which receives the speed sensor signal A to determine whether or not signals are being developed by the Speed Sensor 10 and coupled to the module. In the event of speed signal breakdown, Failsafe III detects this condition and developes the Failsafe monitor pulse signal X3, which is also coupled to the Failsafe Logic circuit 80.

Failsafe IV is an open solenoid detector which receives the output signal F from the Output Driver circuit 34 for the purpose of determining whether or not the Brake Controller Solenoid is functioning properly. In the event the Brake Controller Solenoid is malfunctioning, i.e., is open, Failsafe IV detects this condition and develops the Failsafe monitoring pulse signal X4 which is also coupled to the Failsafe Logic circuit 80.

The output signal F developed by the Output Driver circuit 34 is also coupled to the Failsafe Logic circuit 80, and a long with the Failsafe monitoring pulse signals X3 and X4, the Failsafe Logic circuit develops two failsafe logic pulse signals Y1 and Y2. In addition, the Failsafe Logic circuit 80 monitors the brake switch of the vehicle and the module actuator switch of the brake control system to determine whether or not these switches are actuated when the land vehicle is in a braking condition and the brake control system is operating.

The Lamp Driver circuit 40 includes a Time Delay circuit 86 and a Lamp Driver 88. In response to the failsafe logic pulse signal Y2, the Time Delay circuit 86 delays the signal a preselected period of time and couples the delayed failsafe logic pulse signal 22 to both the Lamp Driver 88 and to the Fuse Blow circuit 38. Thus, when there is a power loss detected by the Failsafe II detector 74, and the Failsafe signal X2 is developed and coupled to the Lamp Driver 88, and the delayed Failsafe logic pulse signal Z2 is also coupled to the Lamp Driver 88, the Lamp Driver 88 is actuated, causing a light to go on (or a buzzer to ring) and thereby alerting the operator of the land vehicle that the brake control system is not functioning properly.

The Fuse Blow circuit 38 includes a Fuse Blow Logic circuit 82 and a Fuse Blow 84. In response to the Failsafe logic pulse signal Y1 and the delayed failsafe logic pulse signal Z2, the Fuse Blow Logic circuit 82 develops a fuse blow pulse signal Z1 which is coupled to the Fuse Blow 84. Thus, when an overcurrent condition exists in the brake system, as detected by the Failsafe I Overcurrent Detector 72, the failsafe pulse signal X1 is produced and coupled to the Fuse Blow 84 and in circuit combination with the fuse blow logic pulse signal Z1, a fuse is blown (or a circuit breaker disconnected). The braking system is therefore disconnected from the power supply of the system, i.e., regulator 42, because an overcurrent condition is one in which module damage is highly probable and removal of power to the module is positive mode for preventing any further damage to the brake control system.

The Failsafe Logic circuit 80 also monitors open sensor condition (Failsafe III) and open solenoid condition (Failsafe IV). When either or both of the failsafe pulse signals X3 and X4 are coupled to the Failsafe Logic circuit 80, the failsafe logic pulse signal Y2 is developed and coupled to the Time Delay circuit 86 to produce the time dealy pulse signal Z2 and to actuate the Lamp Driver 88 and once again indicate to the operator of the lane vehicle that the braking system of his vehicle is not operating properly.

MODE OF OPERATION

Fundamentally, the skid control module of this invention develops eight gate control signals, which are as follows:

1. The Slip and Ramp Signal Generator and Comparator 14 develops a "slip" gate control signal D, controls module output "turn on" and "turn off", which selectively inhibits the brake system of the land vehicle and selectively allows the brake system to operate in a normal manner.

2. The Variable Threshold Deceleration Gate circuit 24 develops a "decel" gate control signal K which programs the Acceleration Programmed Oscillator circuit 28 and the Brake Control Logic circuit 18.

3. The Fixed Threshold Variable Duty Cycle Pulse Generator 32 develops the "duty cycle" gate control signal M which controls the oscillator Logic circuit 70 of the Brake Control Logic circuit 18.

4. The Variable Threshold Acceleration Gate circuit 26 develops an "accel" gate control signal Q which programs the "slow" ramp characteristics of the Ramp Logic circuit 66 of the Brake Control Logic circuit 18 and "sets" the Reset Timer and Gate circuit 30.

5. The dc Level Detector and Zero Velocity Gate circuit 16 produces a "zero velocity" gate control signal I which further programs the "slow" ramp characteristics of the Ramp Logic circuit 66 of the Brake Control Logic circuit 18 and inhibits the "duty cycle" gate control signal M from controlling the Oscillator Logic circuit 70 of the Brake Control Logic circuit 18.

6. The Reset Logic circuit 64 of the Brake Control Logic circuit 18 develops a "reset logic" gate control signal T in response to the output signal F1 developed by the Output Driver circuit 34, and controls or resets the Reset Timer and gate circuit 30.

7. The Oscillator Logic circuit 70 of the Brake Control logic circuit 18 develops an "osc. Logic" gate control signal R which turns the output of the skid control module off, i.e., it overrides the "slip" gate control signal D and the "reset" gate control signal V, and it programs the "fast" ramp characteristics of the Ramp Logic circuit 66 of the Brake Control Logic circuit 18.

8. The Reset Timer and Gate circuit 30 produces a "reset" gate control signal V in response to the "reset logic" gate control signal T and turns the skid control module output on during the time period that the "accel" gate control signal Q is on.

At time TO the land vehicle is operating in a normal mode with its anti-skid brake system disengaged. The vehicle wheel speed is as shown in FIG. 3A and the remaining output conditions of the other circuit components of the skid control module of this invention are exemplified in the wave form diagrams of FIG. 3.

AT TIME T1

EVENT 1—The land vehicle wheel speed rate of deceleration exceeds the rate of deceleration threshold established by the Variable Threshold Deceleration Gate circuit 24, as exemplified by the varying d.c. signals B, G and H.

EVENT 2—The d.c. Level Detector and Zero Velocity Gate circuit 16 develops the varying d.c. signals G and H which follow the varying d.c. signal B until signal B falls below the d.c. level set by the d.c. Level Detector 56.

EVENT 3—The Deceleration Differentiator circuit 20 develops the decel. diff. signal 0 which is proportional to the rate of deceleration of the varying d.c. signal G.

EVENT 4—When the decel. diff. signal 0 of the Deceleration Differentiator circuit 20 exceeds the voltage threshold as set by the Variable Threshold Deceleration Gate circuit 24, the decel. gate signal K is generated thereby.

EVENT 5—The decel. gate signal K of the Variable Threshold Deceleration Gate circuit 24 programs the Acceleration Programmed Oscillator circuit 28 and drives the accel osc. signal L into its low state.

EVENT 6—When the accel. osc. signal L of the Acceleration Programmed Oscillator circuit 28 is driven to its low state, the Fixed Threshold Variable Duty Cycle Pulse Generator 32 turns on, whereupon the duty cycle gate control signal M changes to its high state, the ramp logic signal N changes to its high state, and the ramp logic signal S changes to its low state.

EVENT 7—The ramp logic signal N of the Ramp Logic circuit 66 controls the Ramp Signal generator 52 so that the ramp signal C stops following the varying d.c. signal B of the Frequency Converter 12.

AT TIME T2

EVENT 1—The varying d.c. signal B of the Frequency Converter 12 falls below the voltage level of the ramp signal C of the Ramp Signal Generator 52, which is now in its "hold" condition.

EVENT 2—When the varying d.c. signal B falls below the voltage level of the ramp signal C, the comparator signal D of the Comparator circuit 54 is driven to its high state.

EVENT 3-The comparator signal D drives the Output Logic circuit 68 and causes the output logic signal E developed thereby to go into its low state.

EVENT 4—When the output logic signal E goes to its low state, it drives the Output Driver circuit 34, thus causing the output signal F developed thereby to go into its high state.

EVENT 5—When the output logic signal F goes to its high state, the brake system of the land vehicle is inhibited or released (via the brake controller solenoid).

AT TIME T3

EVENT 1—The wheel speed rate of deceleration decreases below the rate of deceleration threshold set by the Variable Threshold Deceleration Gate circuit 24 as exemplified by the varying d.c. signals B, G & H.

EVENT 2—The decel. diff. signal 0 of the Deceleration Differentiator circuit 20 proportionally decreases with respect to the rate of decrease of the d.c. level signal G of the d.c. Level Detector 56.

EVENT 3—When the decel. diff. signal 0 drops below the voltage threshold set by the Variable Threshold Deceleration Gate circuit 24, the decel gate control signal K changes to its low state.

EVENT 4—When the decel gate control signal K of the Variable Threshold Deceleration Gate circuit 24 changes to its low state, the accel osc. signal L of the Acceleration Program Oscillator circuit 28 changes to its high state at a preselected rate of change.

EVENT 5—The osc. logic gate control signal R of the Oscillator Logic circuit 70 changes to its high state when the decel gate control signal K of the Variable Threshold Deceleration gate circuit 24 changes to its low state.

EVENT 6—The osc. logic gate control signal R of the Oscillator Logic circuit 70 drives the Output Logic circuit 68 and causes the output logic signal E thereof to change to its high state.

EVENT 7—The pulse E of the output logic circuit 68 drives the output driver circuit and causes the pulse F thereof to go to its low level condition and thereby reapply brake pressure to the brake system of the land vehicle.

AT TIME T4

EVENT 1—When the accel osc. signal L of the Acceleration Programmed Oscillator circuit 28 exceeds the threshold level set by the Fixed Threshold Variable Duty Cycle Pulse Generator 32, the duty cycle gate control signal M produced thereof changes to its low state.

EVENT 2—When the duty cycle gate control signal M changes to its low state, the osc. logic gate control signal L changes to its low state and it causes the ramp logic signal N, and the output logic signal E to change to their low states and the output driver signal F to change to its high state.

EVENT 3—When the ramp logic signal N changes to its low state, it drives the Ramp Signal Generator 52 out of its hold condition thus allowing the ramp signal generator 52 to commence further discharging.

EVENT 5—When the ramp logic signal N changes to its low state and the output driver signal F changes to its high state, the reset logic gate control signal T of the Reset Logic circuit 64 changes to its high state.

During this time period T4 there if a finite "second order" of events occurring. They are as follows:

EVENT $1^2$—The wheels of the land vehicle are beginning to accelerate as shown by the varying d.c. signals B, G and H.

EVENT $2^2$—The accel. diff. signals J and P of the Acceleration Differentiator circuit 22 are proportional to the rate of acceleration of the vehicle wheel speed.

EVENT $3^2$—The accel gate control signal Q switches to its high state.

EVENT $4^2$—The ramp logic circuit 66 is programmed into its low state by the accel gate control signal Q developed by the Variable Threshold Acceleration Gate circuit 26.

AT TIME T5

EVENT 1—The Acceleration Programmed Oscillator circuit 28 switches into its low state when the accel. osc. signal L generated thereby reaches the analog voltage level programmed by the accel diff. signal J of the Acceleration Differentiator 22.

EVENT 2 — When the accel. osc. signal L drops below the voltage threshold set by the Fixed Threshold Variable Duty Cycle Pulse Generator 32, the duty cycle gate control signal M produced thereby switches to its high state.

EVENT 3 — When the reset timer signal U switches to its high state the oscillator logic signal R switches to its high state.

EVENT 4 — The ramp logic signal S and the output logic signal E follow the oscillator logic signal R.

EVENT 5 — When the output logic signal E switches to its high state, the output driver signal F switches to its low state.

EVENT 6 — The reset logic gate control signal T follows the output driver signal F.

NOTE — Between time T4 and T5, the voltage level of the reset timer signal U increases slowly at a linear rate during the time period in which the reset logic pulse gate control signal T is in its high state.

AT TIME T6

EVENT 1 — The ramp signal C changes to a voltage level below the voltage level of the varying d.c. signal B developed by the Frequency Convertor 12.

EVENT 2 — The comparator signal D switches to its low state.

EVENT 3 — The output driver signal F remains in its low state.

EVENT 4 — The output logic signal E remains in its high state.

NOTE — The comparator signal D and the reset gate control signal V are the only gate control signals of the module which can turn on or reactivate the brake system of the land vehicle.

NOTE — The accel. osc. signal L, the duty cycle gate control signal M, the oscillator logic gate control signal R and the ramp logic signal S continue to switch or oscillate at a duty cycle that is programmed by the rate of acceleration of the wheels as indicated by the d.c. level signal H (see T6-T8).

AT TIME T7

EVENT 1 — The rate of acceleration of the d.c. level signal H falls below the rate of acceleration threshold set by Variable Threshold Acceleration Gate circuit 26.

EVENT 2 — The accel diff. signal P drops below the voltage threshold set by the Variable Threshold Acceleration Gate circuit 26 and the acceleration gate control signal Q produced thereby switches to its low state.

EVENT 3 — The ramp logic signal S remains in its high state unresponsive to the accel gate control signal Q provided the oscillator logic signal R is in its high state.

AT TIME T8

The same seven events that occurred during time period T1 also occur during this time period.

AT TIME T9

The same five events that occurred during time period T2 also occur during this time period.

AT TIME T10

EVENT 1 — The variable d.c. signal B falls below the voltage level set by the d.c. Level Detector 56 (noter signals G and H).

EVENT 2 — The variable d.c. signals G and H are clamped at a preselected d.c. level.

EVENT 3 — The d.c. Level Detector 56 produces the d.c. level signal Il, which is an analog representation of the varying d.c. signal B when it falls below the threshold set by the d.c. Level Detector 66.

EVENT 4 — The zero velocity gate control signal I switches to its high state and inhibits the Oscillator Logic circuit 70 from producing the oscillator logic gate control signal R.

EVENT 5 — The decel diff. signal O of the Deceleration Differentiator circuit 20 proportionally decreases with respect to the rate of decrease of the d.c. level signal G of the d.c. Level Detector 56.

EVENT 6 — When the decel diff. signal O drops below the voltage threshold set by the Variable Threshold Deceleration Gate circuit 24, the decel gate control signal K changes to its low state.

EVENT 7 — When the decel gate control signal K of the Variable Threshold Deceleration Gate circuit 24 changes to its low state, the accel. osc. signal L of the Acceleration Program Oscillator circuit 28 changes to its high state at a preselected rate of change.

NOTE — During event 6 above, the oscillator logic gate control signal R is inhibited during this time period as opposed to its going to its high state as it did during time period T3.

AT TIME T11

EVENT 1 — The accel osc. signal L exceeds the fixed threshold set by the Fixed Threshold Variable Duty Cycle Pulse Generator 32 wherein the duty cycle gate control signal M switches to its low state.

EVENT 2 — The ramp logic signal N switches to its low state.

EVENT 3 — The reset logic gate control signal T follows the output driver signal F, i.e., it switches to its high state.

EVENT 4 — The reset timer signal U changes at a substantially constant rate in a positive direction.

AT TIME T12

EVENT 1 — The varying d.c. signal B increases to a d.c. level above the d.c. level set by the d.c. Level Detector 56, i.e., the vehicle wheels are accelerating at a low rate of acceleration.

EVENT 2 — The d.c. level signal Il reaches a d.c. level that "turns-off" the Zero Velocity Gate circuit 58 whereupon the zero velocity gate control signal I switches to its low state.

EVENT 3 — The voltage level of accel. diff. signals J and P change to a positive value at a rate that is proportional to the rate of change of the varying d.c. signal H.

EVENT 4 — When the accel. diff. signal P exceeds of preselected d.c. level, the accel gate control signal Q switches to its high state.

EVENT 5 — The accel osc. signal L switches to its low state in response to the accel. diff. signal J and begins to oscillate at a frequency proportional thereto.

EVENT 6 — The duty cycle gate control signal M switches to its high state when the accel. osc. signal L switches to its low level.

EVENT 7 — The oscillator logic gate control signal R, the output logic signal E and the ramp logic signal S switch to their high state.

EVENT 8 — When the oscillator logic gate control signal R switches to its high state, the reset logic signal T switches to its low state.

EVENT 9 — When the output logic signal E switches to its high state, the output driver signal F switches to its low state ot "in the module turned off" condition.

EVENT 10 — When the output driver signal F switches to its low state, the reset timer signal U starts to slowly change in a negative direction.

EVENT 11 — When the ramp logic signal S switches to its high state, the ramp signal C switches from its "slow" discharge state to its "fast" discharge state.

AT TIME T13

EVENT 1 — The ramp signal C falls below the voltage level of the frequency convertor signal B.

EVENT 2 — The comparator signal D switches to its low state or "turns off".

NOTE — Between Time Periods T12 and T13, the reset timer signal U reaches the d.c. level set by the reset timer 60 and switched to its low state, which opens the Reset Gate circuit 62 and causes the reset gate signal V to switch to its high state. The reset gate signal V caused the Output Logic signal E to switch to its high state and hold the Output Driver circuit 34 in its "on" condition except when the oscillator logic signal R is in its low state.

AT TIME T14

The same six events that occurred during time period T5 also occur during this time period.

AT TIME T15

EVENT 1 — The Acceleration Programmed Oscillator circuit 28 switches into its high state when the accel. osc. signal L generated thereby falls below the analog voltage programmed by the accel. diff. signal J of the Acceleration Differentiator 22.

EVENT 2 — When the accel. osc. signal L rises above the voltage threshold set by the Fixed Threshold Duty Cycle Pulse Generator 32, the duty cycle gate control signal M produced thereby switches to its low state.

EVENT 3 — When the reset timer signal U switches to its low state, the oscillator logic signal R switches to its low state.

EVENT 4 — The ramp logic signal S and the output logic signal E follow the oscillator logic signal R.

EVENT 5 — When the output logic signal E switches to its low state, the output driver signal F switches to its high state.

EVENT 6 — The reset logic gate control signal T follows the output driver signal F.

AT TIME T16

The same six events occurred during time period T15 also occur during this time period.

AT TIME T17

EVENT 1 — The rate of acceleration of the wheels of the land vehicle falls below the threshold set by the Variable Threshold Acceleration Gate circuit 26.

EVENT 2 — The accel. diff. signal P falls below the voltage threshold set by the Variable Threshold Acceleration Gate circuit 26.

EVENT 3 — The accel. gate control signal Q switches to its low state.

EVENT 4 — The ramp logic signal S switches to its high state and the reset gate control signal V switches to its low state.

EVENT 5 — In response to the reset gate control signal V, the output logic signal E switches to its high state and the output driver signal F switches to its low state.

DETAILED DESCRIPTION — FIGS. 4A–4D

Referring to FIGS. 4A–4D, wherein a detailed schematic diagram of a skid control module of one embodiment of the present invention is shown, the Voltage Regulator 42 produces positive dc regulated voltages, such as the B source (e.g., +8 volts) on line 90, and the B+ source (e.g., +13 volts) on line 92. The Voltage Regulator 42 is connected to and operates from the land vehicle battery system via terminals 75. An example of a satisfactory Voltage Regulator for this embodiment of a skid control module is shown and described in the aforementioned copending patent application Ser. No. 025,131. The B+ line 92 is used to drive the transistors of the Output Logic Circuit 68 and the Output Driver Circuit 34, while the B source line 90 is used to drive the transistors of the remaining circuits of this embodiment of the present invention.

As mentioned above with regard to the detailed description of FIGS. 1–3, the frequency convertor 12 receives frequency varying signals at terminals 77 from either a wheel sensor, such as that described in the abovementioned copending patent application Ser. No. 025.131, or from a drive shaft sensor (not shown) and converts such freuency varying signals into dc varying signals as shown in FIG. 3 by waveform B. The varying dc signal B appears at terminal 80 and is coupled to the Slip Signal Generator 50 via line 81, to the Comparator circuit 54 via lines 94 and 95, and to the dc Level Detector 56 via line 94. The Frequency Convertor 12 also generates an output signal B1 which is coupled to the dc Level Detector 56 via line 96.

The Slip Signal Generator 50 receives the varying dc signal B via line 81 and the votage divider network which includes divider resistors R1, R2, R3 and R4 for dividing down the varying dc signal B. The varying dc signal B is then coupled via line 98 to a differential amplifier which includes transistors T1 and T2. The differential amplifier transistors T1 and T2 have their collector terminals respectively connected to the collector terminals of current source transistors T4 and T5, which in turn have their emitter electrodes respectively coupled to the B source line 91 via emitter bias resistors R6 and R7, respectively, and their base terminals connected in common. The base terminal of current source transistor T4 is coupled back to the collector terminal thereof. The output of the differential amplifier (transistors T1 and T2) is taken from the collector terminal of transistor T2 through an output transistor T3 that has its collector terminal connected to the B source line 91 via load resistor R9 and its emitter terminal connected to the base terminal of transistor T2. The emitter terminals of the diff. amp. transistors T1 and T2 are connected in common and to the switching transistor T6 via emitter bias resistor R8. The switching transistor T6 has its emitter connected to ground and its base connected to the B source line 91 via base bias resistor R10. Coupled across the base and emitter of the switching transistor T6 is an invertor amplifier transistor T8 having its collector coupled to the base of the switching transistor T7, its emitter coupled to ground, and its base coupled to the cathodes of the input diodes D2 and D3 via limiting resistor R30. When the ramp logic signal N is high, as during time period T1–T4, the Slip Signal Generator 50 inhibits the capacitor C1 from discharging through the transistor T9, as shown by the ramp signal C of FIG. 3. A switching transistor T7 is also provided in Slip Signal Generator 50. The switching transistor T7 has its collector connected to the B source line 98 via bridge resistor R4, its emitter connected to ground and its base connected through limiting resistor R5 and line 106 to the Reset Timer 60. Thus, when the reset timer signal U2 goes on it drives the base of the switching transistor T7 high and transistor T7 into its conductive state, which in turn changes the slip signal divider circuits R1, R2, R3, R4. That is to say, the divider resistor R4 of the divider circuit is coupled in parallel to divider resistor R2 in Slip Signal Generator 50.

The Ramp Signal Generator 52, in addition to the discharge transistor T9, includes current source transistors T10, T11 and T13 for setting the current bias for the discharge transistor T9. The current source transistors T10 and T11 have their collectors connected in common and to the B source line 90 through the collector bias resistor R12, and their emitters respectively coupled to ground through emitter bias resistors R13 and R14. The base of the current source transistor T10 is coupled to the base of the discharge transistor T9, while the collector thereof is connected back to its base. The current source transistor T13 has its collector connected to the B source line 90 through the collector bias resistor R15, its emitter connected to ground through the emitter bias resistor R16 and its base connected to the base of the current source transistor T11. The collector of the current source transistor R13 is coupled back to its base. A logic transistor T12 is coupled across the emitter bias resistor R14 of the current source transistor T11. That is to say, the collector of transistor T12 is coupled to the emitter of transistor T11, the emitter of transistor T12 is coupled to ground and its base is connected to the cathode of diode D1 which has its anode connected to the output of the Ramp Logic Circuit 66 via line 103. The logic transistor T14 is coupled across the current source transistor T13. That is to say, the collector of the logic transistor T14 is connected to the collector of the current source transistor T13, the emitter of the logic transistor T14 is connected to ground, and the base of the logic transistor T14 is connected to the B source line 90 through base bias resistor R17 and to the Ramp Logic Circuit via line 98. When the logic transistor T12 is on, the Ramp Signal Generator 52 is in a hold condition. That is, the current source transistor T11 substantially draws all the current through the collector bias resistor R12 so that the current through the discharge transistor T9 and the current source transistor T10 substantially approach zero or are each in a very low conductive state so as to prevent capacitor C1 from discharging through the discharge transistor T9. Therefore, when the Ramp Logic Signal N is high, so as to forward bias the diode D1 and drive the logic transistor T12 into its high conductive state, the ramp signal C developed by the Ramp Signal Generator 52 is substantially "flat" as shown during the time period T1–T4. When the logic transistor T14 is in its high conductive state, it essentially connects the bases of the current source transistors T13 and T11 to ground. The current source transistor T11 draws substantially zero current upon this occurrence or is in its low conductive state. Consequently, the discharge transistor T9 and the current source transistor T10 are in their high conductive states and draw maximum current. This in effect allows the capacitor C1 to discharge at a high rate through the discharge transistor T9. Accordingly, when the Ramp Logic Signal S is in its high state so as to drive the logic transistor T14 into its high conductive state, the ramp signal C generated by the Ramp Signal Generator 52 rapidly "falls" as shown during time period T4–T6.

The comparator 54 comprises a differential amplifier including transistors T15, T16 and T17, output transistors T18, T19 and T21, logic transistor T20 and current source transistors T22 and T23. The diff. amp. transistors T15 and T17 have their emitters connected in common to the collector of the diff. amp. transistor T16, which in turn are connected to the collector of the current source transistor T22. The collectors of the diff. amp. transistors T15 and T17 are respectively coupled to ground through collector bias resistors R18 and R19, while the emitter of the diff. amp. transistor T16 is coupled directly to ground. The current source transistors T22 and T23 have their emitters respectively coupled to the B source line 90 via emitter bias resistors R26 and R27, and their bases connected in common. The collector of current source transistor T23 is connected to ground through the collector bias resistor R28, and is coupled back to its base. The output transistor T18 has its collector connected to the B source line 90 through load resistor R25, its emitter connected to ground and its base connected to the collector of the diff. amp. transistor T17 through the limiting resistor R21. The invertor amp. transistor T21 has its base connected to the collector of output transistor T18, its emitter connected to ground and its collector connected to the B source line 90 through load resistor R29. The output of the Comparator Circuit 54 is developed across the load resistor R29, and is coupled to the Output Logic Circuit 68 via diode D12. The output transistor T19 has its collector connected to the base of the diff. amp. transistor T17 through limiting resistor R22, its base connected to the collector of transistor T17 through limiting resistor R20 and its emitter connected to ground. Connected across the output transistor T19 and limiting resistor R22 is the logic transistor T20 and limiting resistor R23, wherein the collector thereof is connected to the base of transistor T17 through limiting resistor R23, the emitter is grounded and the base connected to the Reset Timer circuit 60 via limiting resistor R23' and line 106. The two inputs to the Comparator Circuit 54 are received at terminal 93 via line 95' (ramp signal C) and via line 95 and limiting resistor R24 (varying dc signal B). The output signal D of the Comparator Circuit 54 is also coupled back to the invertor amp. transistor T8 via line 100, diode D3 and limiting resistor R30. Resistors R22, R23 and R24 make up a current divider circuit in Comparator Circuit 54. That is to say, when the reset signal U2 drives the logic transistor T20 into its high conductive state, the logic transistor T20 changes the current divider R22, R23, R24.

The dc Level Detector 56 comprises a differential amplifier, T24, T25, and an output circuit T26. The diff. amp. transistor T24 has its collector connected to the B source line 90 while the diff. amp. transistor T25 is connected to the B source line 90 via the collector bias resistor R33. The diff. amp. transistors have their emitters connected in common to ground via the emitter bias resistor R32, and their bases respectively connected to lines 94 and 96, the former through limiting resistor R31. The output transistor T26 has its emitter connected to the B source line 90 via the emitter bias resistor R34, its collector connected to ground, and its base connected to the emitters of the diff. amp. transistors T24, T25. Capacitor C2 is connected between ground and the base of the diff. amp. transistor T24, with the junction thereof being coupled to ground through bias resistor T35. This R-C circuit prevents any ac components that may be developed by the diff. amp. transistors T24, T25 from being coupled to the output transistor T26. Output transistor T26 is coupled in an emitter follower configuration so that no gain is achieved in the generation of the dc level signal G which is coupled to the Decel Diff. Circuit 20 via limiting resistor R37 and coupling capacitor C3.

The Zero Velocity Gate Circuit 58 includes an output transistor T27 having its emitter connected to the B source line 90, its base connected to the B source line 90 via base bias resistor R33 and its collector connected to ground via the load resistor R36. The zero velocity gate signal I is developed across the load resistor R36 and coupled to the Oscillator Logic Circuit 70 via line 110 and diode D11, and to the Ramp Logic Circuit 66 via diode D6. Thus, in effect the Zero Velocity Gate Circuit 58 develops the zero velocity gate signal I in response to the output of the dc Level Detector 56 that is developed across the load resistor R33 of the diff. amp. transistor T25.

The Deceleration Differentiator Circuit 20 includes differentiator transistors T28 and T29. The diff. amp. transistor T28 has its collector connected to the B source line 90 via the load resistor R38, its base connected to the B source line 90 via the base bias resistor R39 and its emitter connected to the coupling capacitor C3. The diff. amp. transistor T29 has its collector connected to the base of diff. amp. transistor T28, its base connected to the emitter of diff. amp. transistor T28 with its emitter grounded. Thus, when the dc level signal G is coupled to the Decel. Diff. Circuit 20 it is differentiated by the differentiator circuit above described to produce the decel diff. signal O, which is coupled to the Variable Threshold Decel Gate Circuit 24. The differentiated output signal of the Decel Diff. Circuit 20 is developed across the R-C network including capacitor C4 and resistor R40 is circuit interrelationship with the diff. transistor T30'. The output terminal of the Decel Diff. Circuit 20 is connected to ground through capacitor C4, and through resistor R40 and the collector emitter circuit of diff. transistor T30'. The diff. transistor T30' has its base connected to ground through the base bias resistor R46.

The Variable Threshold Decel Gate Circuit 24 includes a differential amplifier (T30, T31), complementary emitter follower circuit (T32, T33), and an output circuit (T34). The diff. amp. transistor T30 has its collector connected to the B source line 90 and its base connected to the collector of output transistor T28, while the diff. amp. transistor T31 has its collector connected to the B source line 90 via the load resistor R42, and both of the diff. amp. transistors T30 and T31 have their emitters connected in common to ground through the emitter bias resistor R41. The base of the diff. amp. transistor T31 is also connected to the B source line 90 through the blocking capacitor C5 and the base bias resistor R43. The emitter follower transistor T32 has its collector connected to the B source line 90, while the emitter follower transistor T33 has its collector connected to ground. The emitter and bases of the complementary emitter follower transistors T32 and T33 are connected in common, with their bases connected to the collector of the output transistor T28 and their emitters connected to the junction of the voltage divider resistors R43 and R44, which in turn are coupled between ground and the B source line 90. The output transistor T34 has its emitter connected to the B source line 90, its collector connected to ground through resistor R47, and its base connected to the load resistor T42. The voltage divider resistor R45 is connected between the collector of the output transistor T34 and the voltage divider resistor R46.

The Accel Differentiator Circuit 22 comprises a differentiator amplifier for differentiating the dc level detector signal H to produce the accel diff. signals J and P, and includes transistors T35, T36 and T37. The diff. amp. transistor T35 has its base connected to the base of the diff. amp. transistor T36, and its emitter connected to the dc Level Detector 56 via limiting resistor R48, coupling capacitor C6 and limiting resistor R46, while its collector is connected to the input terminal of the Accel Program Oscillator Circuit 28 for coupling the accel diff. signal J thereto. The diff. amp. transistor T36 has its collector connected to ground through an R-C network including capacitor C7 and collector bias resistor R50, its base connected to ground through base bias resistor R52 and to the collector of transistor T37, and its emitter connected to the base of the diff. amp. transistor T37 through the limiting resistor R51. The diff. amp. transistor T37 has its emitter connected to the B source line 90, its collector connected to ground through bias resistor T52, and its base connected to the junction of coupling capacitor C6 and limiting resistor R49. Thus, when the decel level detector signal H is coupled to the Accel Diff. Circuit 22, the accel diff. signal J is developed in the collector circuit of diff. amp. transistor T35 and coupled to the Accel Program Oscillator Circuit 28, while the accel diff. signal P is developed by the R-C network C7 and R50 and coupled to the Variable Threshold Accel Gate Circuit 26.

The Variable Threshold Accel Gate Circuit 26 includes a complementary emitter follower circuit (T38, T39), a differential amplifier circuit (T40, T41, T42), and an output amplifying circuit (T43). The complementary emitter follower transistors T38, T39 have their collectors respectively coupled to the B source line 90 and ground, with their emitters and bases connected in common, the bases thereof coupled to receive the accel diff. signal P developed by the Accel Diff. Circuit 22, while their emitters are coupled to the base of the diff. amp. transistor T41. The complementary emitter follower transistors T38, T39 drive the base of the diff. amp. transistor T41 so that it follows the base of the diff. amp. transistor T40, plus or minus one diode drop. The diff. amp. transistor T40 has its emitter connected to the B source line 90 via load resistor R53 and its collector connected to ground via the collector bias resistor R54, while the diff. amp. transistor T41 has its emitter also connected to the B source line 90 via load resistor R53 and its collector connected directly to ground. The base of diff. amp. transistor T41 is connected to the B source line 90 via base bias resistor R55 and to the R-C network including capacitor C8 and resistor R56 to ground. The diff. amp. transistor T42 has its collector connected to the B source line 90 via load resistor R57, its emitter connected directly to ground, and its base connected to the load resistor R54. The output transistor T43 has its collector connected to the B source line 90, its base connected to the load resistor R57 and its emitter connected to the isolating resistor R58, which is coupled between the emitter of diff. amp. transistor T42 and output transistor T43. The Variable Threshold Accel Gate signal Q is developed across the load resistor R57, amplified by transistor T43, and coupled via line 114 to the Ramp Logic Circuit 66 via diode D5 and to the Reset Gate Circuit 62 via limiting resistor R83.

Referring now to the Accel Program Oscillator Circuit 28, this circuit includes a logic circuit (T44), a current source circuit (T45, T47), and an oscillator circuit (T46, T48, T49). The logic transistor T44 receives the threshold decel gate signal K at its base via the blocking diode D3 and limiting resistor R60. The logic transistor T44 has its emitter connected to ground and its collector connected to the B source line 90 via load resistor R62. The current source transistors T45, T47 drive the collector circuit of transistor T46 and set the voltage thereof through the load resistor R62. The current source transistor T47 receives at its collector the accel diff signal J and has its emitter connected to ground through the emitter bias resistor R63, and its base connected back to its collector and to the base of current source transistor T45, which in turn has its emitter connected to ground through the emitter bias resistor R61 and its collector connected to the collector of the logic transistor T44, and to the B source line 90 through the load resistor R62. The oscillator transistor R46 also has its collector connected to the B source line 90 through load resistor R62, with its emitter directly connected to ground and its base connected to the junction of limiting resistor R64 and the collector emitter circuit of oscillator transistor T48. Oscillator transistor T48 has its emitter-base circuit connected between the collector of the oscillator transistor T46 and the B source line 90 through the emitter bias resistor R65, while its collector is connected both to the base of oscillator transistor T46 and to the collector of oscillator transistor T49 through the limiting resistor R64. The oscillator transistor T49 has its emitter connected directly to ground and its base connected to the junction of the voltage divider network including resistors R71, R72. A series R-C circuit for developing the accel program oscillator signal L is connected between the B source line 90 and ground that includes the resistor R65 and capacitor C10. The accel program oscillator signal L is developed across the capacitor C10 and is coupled to the Fixed Threshold Variable Duty Cycle Pulse Generator 32. Thus, the capacitor C10 charges through the resistor R65 to a voltage level that is equal to the voltage set on the collector of oscillator transistor T46 by the current source transistors T45, T47. When this occurs, oscillator transistor T48 is driven into conduction and discharges capacitor C10 through oscillator transistors T46 and T49. Accordingly, the frequency developed by the Accel Program Oscillator Circuit 28 will depend upon the voltage set on the collector of oscillator transistor T46 by the current source transistors T45 and T47. That is to say, the frequency will depend upon the accel analog signal J developed by the Accel Diff. Circuit 22 that is coupled to the current source transistor T47 that in turn drives the collector circuit of the oscillator transistor T46.

The Fixed Threshold Variable Duty Cycle Pulse Generator 32 includes a diff. amp. circuit (T50, T51) and an output amplifier circuit (T52). The diff. amp. transistors T50, T51 have their emitters connected in common and to ground through the emitter bias resistor R67, while the base of transistor T50 is connected to receive the accel program oscillator signal L and the base of transistor T51 connected to the voltage divider including resistors R68 and R69. The collector of diff. amp. transistor T50 is coupled to the B source line 90 while the collector of transistor T51 is coupled to the B source line 90 through the load resistor R66. Voltage divider network R68, R69 is coupled between the B source line 90 and ground. The base circuit of the output transistor T52 is coupled to the junction of load resistor R66 and the collector of diff. amp. transistor T51, with its emitter directly connected to the B source line 90 and its collector connected to ground through the load resistor R70. An isolating diode D15 is coupled between the collector of output transistor T52 and divider resistor R71. The duty cycle signal M is developed across the load resistor R70 and is coupled to the Oscillator Logic Circuit 70 via line 112 and limiting resistor R94 and to the Reset Logic Circuit 64 via line 112 and limiting resistor R77. Thus, when the voltage on capacitor C10 is below the voltage level set by the divider resistors R68 and R69, the output transistor T52 is driven into conduction so as to produce the duty cycle signal M.

The Reset Logic Circuit 64 includes two logic transistors T53, T54, with logic transistor T53 having its collector connected to the B source line 90 through load resistor R75, its emitter connected to ground and its base connected to the junction of limiting resistors R73 and R74, which in turn are connected in series between ground and the collector of transistor T65 of the Output Logic Circuit 68. When the logic transistor T53 is gated or driven into conduction by the presence of the comparator gate signal D, or the reset gate signal V, via the OR gate diodes D12 and D13. The Reset Logic Circuit 64 produces the reset logic signal T, which is coupled to the Reset Timer Circuit 60. Also, when the logic transistor T54 is gated or driven into its conductive state by the duty cycle signal M, the Reset Logic Circuit signal 64 produces a positive pulse; i.e., the reset logic signal T goes high as shown during time periods T11 and T12.

The Reset Timer Circuit 60 includes an invertor amplifier (T55), a logic circuit (T56) and a latching circuit (T57, T58). The invertor amp. transistor T55 has its collector connected to the B source line 90 via load resistor R78 and to the blocking diode D4, its emitter is connected to ground and its base connected to the load resistor R75 of the Reset Logic Circuit 64, and to the collector of the logic transistor T56. The logic transistor T56 has its emitter grounded and its base connected to the ramp logic circuit 66 via limiting resistor R80. The cathode of the blocking diode D4 is connected to ground through the charging capacitor C11, and to the emitter of the latching transistor T57 via the limiting resistor R79. The latching transistor T57 has its base connected to the B source line 90 via the base bias resistor R82 and to the collector of the latching transistor T58, its collector connected to the base of the latching transistor T58 through the load resistor R81, and to the Slip Signal Generator Circuit 50 via line 106 and limiting resistor R5. When the voltage across the capacitor C11 reaches the voltage level set by the resistors R82 and R82', both of the latching transistors T57 and T58 are driven into their high conductive state whereupon the reset timer signal U1 goes low while the reset timer signal U2 goes high. Also, the output transistor T59 of the Reset Gate Circuit 62 develops the reset gate signal V, which is in its high state when the voltage across capacitor C11 reaches the voltage level set by resistors R82 and R82'. The output transistor T59 of the reset gate 62 has its emitter connected to ground and its collector connected to the Ramp Logic Circuit 66 via the blocking diode D5 and to the Output Logic Circuit 68 via the blocking diode D13.

The Ramp Logic Circuit 66 includes three logic circuits, respectively including transistors T60, T61 and T62. The logic transistor T60 has its emitter connected to ground, its base connected to the junction of resistors R84 and R85 and its collector connected to receive the duty cycle signal M via terminal 112 and resistor R86. The logic transistor T61 has its emitter connected to ground, its base connected to the junction of resistors R88 and R91, and its collector connected to resistor R87 and to the anode of the blocking diode D8. The logic transistor T62 has its emitter connected to ground, its base connected to the junction of resistors R89 and R90 and the cathode of the limiting diode D8, and its collector connected to the Ramp Signal Generator 52 via line 98. The logic transistor T60 is driven by the accel gate signal Q, while the logic transistor T61 is driven by the oscillator logic signal R for preventing the accel gate signal Q from forward biasing the diode D8 and thereby driving the logic transistor T62 into its high conductive state. The logic transistor T62 produces the ramp logic signal S when transistor T62 is biased into its high conductive state; that is, when the oscillator logic signal R is in its high level and when the ramp logic signal N is in its high state and forward biases the diode D9. Thus, the ramp logic signal N developed in response to the variable threshold accel gate signal Q is coupled to the Slip Signal Generator 50 and biases the diode D9, but the ramp logic signal S does not go to its high level until the oscillator logic signal R is in its high level.

The Oscillator Logic Circuit 70 includes a logic transistor T63 that has its emitter grounded, its base connected to the junction of resistors R92 and R93 and its collector connected to receive the duty cycle signal M via resistor R95. Resistors R93 and R94 are both connected to ground with resistor R94 having its other end connected to resistor R95 and resistor R93 having its other end connected to the base of transistor T63. Resistor R92 is connected to the junction of the cathodes of the diodes D10 and D11 which in turn have their anodes respectively coupled to receive the decel gate K from the Variable Threshold Decel Gate Circuit 24, and the zero velocity gate 1 from the Zero Velocity Gate Circuit 58. The output of the Oscillator Logic Circuit 70 is coupled to the Output Logic Circuit 68 via the limiting diode D14.

The Output Logic Circuit 68 includes two logic transistors T64 and T65. Logic transistor T64 has its emitter connected to ground and its collector connected to resistor R101. The other end of resistor R101 is connected to ground through capacitor C15. The base of logic transistor T64 is connected to the diode D12 through the series connected resistors R96 and R97. The logic transistor T55 has its emitter connected to ground, its collector connected to the junction of resistors R96, R97 and R98, and its base connected to the junction of resistors R99 and R100. The other end of resistor R99 is connected to the cathode of diode D14 and the other end of resistor R100 is connected to ground. The logic transistor T64 develops the output logic signal E when the comparator signal D or the reset gate signal V are coupled to the diodes D12 and D13 provided the oscillator logic signal R is not coupled to diode D14. The logic transistor T65 produces the logic output signal F1 which is coupled to the base of logic transistor T64 and prevents T64 from being driven into its high conductive state. The output logic signal F1 is coupled to the reset logic circuit 64 via resistor R73.

The Output Driver Circuit 34 includes a current sensing transistor T66 and a power amplifier transistor T67. Transistor T66 has its emitter connected to the B+ line 92, its collector connected to the anode of diode D13 and its base connected to the junction of resistor R106 and diode D14. The power transistor T67 has its collector connected to the B+ line 92, its emitter connected to resistor R105, and its base connected to the anode of diode D14. The base of transistor T68 is connected to the B+ line 92 via resistor R103 with its collector connected to resistor R105, and its emitter to the junction of resistor R106 and diode D14. The output signal F is then coupled to the brake control solenoid, to the Fail Safe IV Circuit 78, and to the Fail Safe Logic Circuit 80.

It will be apparent from the foregoing disclosure that the invention herein described advantageously provides an improved vehicle skid control module for processing wheel speed signals in a vehicle skid control braking system. More particularly, the invention described in here uniquely provides a vehicle skid control module for producing a "pumping" or "pulsing" type braking action in a skid control vehicle braking system which advantageously develop and process vehicle speed, vehicle wheel speed and brake inhibit signals. The vehicle skid control braking system of this invention advantageously utilizes a frequency to voltage convertor, a slip and ramp signal generator, a rate differentiator and variable threshold circuit and a frequency control one shot circuit. Accordingly, the improved vehicle skid control braking system disclosed herein generates brake control signals that vary in accordance with braking conditions, such as vehicle speed, wheel speed, road surface conditions, vehicle wheel speed "slip" conditions, etc.

The terms and expressions which have been employed herein are used as terms of description and not limitation and it is not intended, in the use of such terms and expressions, to exclude any equivalents of the features shown and described, or portions thereof, but is recognized that various modifications are possible within the scope of the present invention.

Without further elaboration, the foregoing is considered to explain the character of the present invention so others may be applying current knowledge, readily adapt the same for use under varying conditions of service, while still retaining certain features which may properly be said to constitute the essential items of novelty involved, which items are intended to be defined and secured by the appended claims.

What is claimed is:

1. In an electronic control system of the type that monitors a first condition of a mechanical system to provide an input to the electronic control system which generates in response thereto output control signals for selectively controlling the mechanical system, a brake control logic circuit for selectively generating an output logic signal from a plurality of input signals representative of other conditions of said mechanical system to enable generation of said output control signals, said brake control logic circuit comprising in combination:

an oscillator logic circuit responsive to a first input signal representative of a preselected value of said first condition, to a second input signal representative of a second condition of said mechanical system, and to a third input signal representative of a third condition of said mechanical system to provide an oscillator logic signal related to said third condition;

output logic circuit means connected to the output of said oscillator logic circuit, said output logic circuit means being responsive to said oscillator logic signal and to a fourth input signal representative of a selected relationship between said first condition and a fourth condition of said mechanical system to generate said output logic signal; and ramp logic circuit means connected to the output of said oscillator logic circuit, said ramp logic circuit means being responsive to said first and third input signals, to said oscillator logic signal, and to a fifth input signal representative of a peselected value of said third condition for generating a hold signal and a slow signal indicative respectively of said second condition and said third condition.

2. A system as set forth in claim 1, wherein said electronic control system is a skid control braking system of a land vehicle and said first condition is vehicle wheel speed.

3. A system as set forth in claim 2, wherein said second condition is wheel deceleration rate exceeding a first level, said third condition is wheel acceleration rate exceeding a second level and said fourth condition is representative of vehicle speed.

4. A system as set forth in claim 3, wherein said preselected value of said first condition is substantially zero wheel speed and said selected relationship is said fourth condition representative of vehicle speed exceeding said wheel speed.

5. A system as set forth in claim 4 and further including reset logic circuit means responsive to said output logic signal and to said hold signal for generating a reset logic signal selectively proportional to actuation of said control system by said output logic signal from said output logic circuit means in generating output control signals.

6. A system as set forth in claim 5, wherein said reset logic signal is proportional to said actuation of said control system in the absence of vehicle wheel deceleration rate above said first level.

7. A system as set forth in claim 4 and further including a ramp signal generator responsive to a slip signal proportional to vehicle wheel speed and to said hold and slow signals to provide a velocity signal programmed into a hold, fast, or slow discharge state by said hold and slow signals, said velocity signal being representative of vehicle velocity.

* * * * *